(12) United States Patent
Okada

(10) Patent No.: US 10,889,282 B2
(45) Date of Patent: Jan. 12, 2021

(54) VEHICLE BRAKE DEVICE

(71) Applicant: TOYOTA JIDOSHA KABUSHIKI KAISHA, Toyota (JP)

(72) Inventor: Yasushi Okada, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/403,750

(22) Filed: May 6, 2019

(65) Prior Publication Data

US 2019/0359195 A1 Nov. 28, 2019

(30) Foreign Application Priority Data

May 25, 2018 (JP) ................................ 2018-100411

(51) Int. Cl.
| | |
|---|---|
| *F16D 65/18* | (2006.01) |
| *B60T 17/16* | (2006.01) |
| *F16D 65/56* | (2006.01) |
| *B60T 13/74* | (2006.01) |

(52) U.S. Cl.
CPC .............. *B60T 17/16* (2013.01); *B60T 13/74* (2013.01); *F16D 65/18* (2013.01); *F16D 65/563* (2013.01)

(58) Field of Classification Search
CPC ........ F16D 65/18; F16D 65/62; F16D 55/226; B60T 13/746
USPC ............................... 188/72.1, 72.4, 156–164
See application file for complete search history.

(56) References Cited

U.S. PATENT DOCUMENTS

| | | | | |
|---|---|---|---|---|
| 7,597,407 | B2 * | 10/2009 | Yamaguchi | B60T 13/746 188/156 |
| 10,378,600 | B2 * | 8/2019 | Tsukamoto | F16D 63/006 |
| 10,611,350 | B2 * | 4/2020 | Ohkubo | B60T 1/065 |
| 2006/0054428 | A1 * | 3/2006 | Danne | F16D 55/00 188/72.1 |
| 2007/0114843 | A1 * | 5/2007 | Kawahara | B60T 7/12 303/122 |
| 2010/0051395 | A1 * | 3/2010 | Sano | B60T 8/885 188/162 |
| 2012/0111673 | A1 * | 5/2012 | Giering | F16D 65/18 188/156 |
| 2014/0069750 | A1 * | 3/2014 | Nohira | F16D 65/62 188/71.8 |

(Continued)

FOREIGN PATENT DOCUMENTS

JP 2015-107745 A 6/2015

*Primary Examiner* — Christopher P Schwartz
(74) *Attorney, Agent, or Firm* — Sughrue Mion, PLLC

(57) ABSTRACT

A brake device for a vehicle, including: a rotary body; a friction member; an actuator including a piston and an electric motor; a piston-retracting prohibiting mechanism including a toothed wheel having ratchet teeth, a stopper configured to lock the ratchet teeth, a stopper biasing mechanism configured to bias the stopper in a direction in which the stopper moves from a locking position to a non-locking position, and a stopper keeping device configured to keep the stopper positioned at the locking position by an electric current supplied thereto, the prohibiting mechanism being configured to prohibit the piston from being retracted in a state in which the stopper locks the ratchet teeth; and a controller configured to control supply of an electric current to the electric motor and supply of the electric current to the stopper keeping device, wherein an electricity storage device is provided in parallel with the stopper keeping device.

6 Claims, 5 Drawing Sheets

(56) References Cited

U.S. PATENT DOCUMENTS

2015/0330466 A1* 11/2015 Masuda .................. G01B 7/00
  188/72.1

* cited by examiner

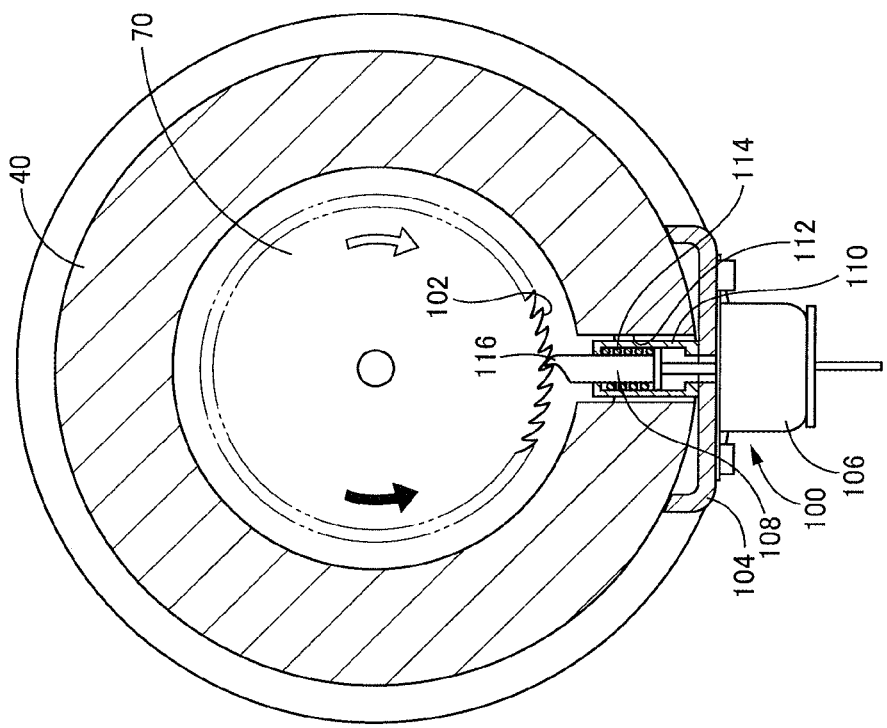
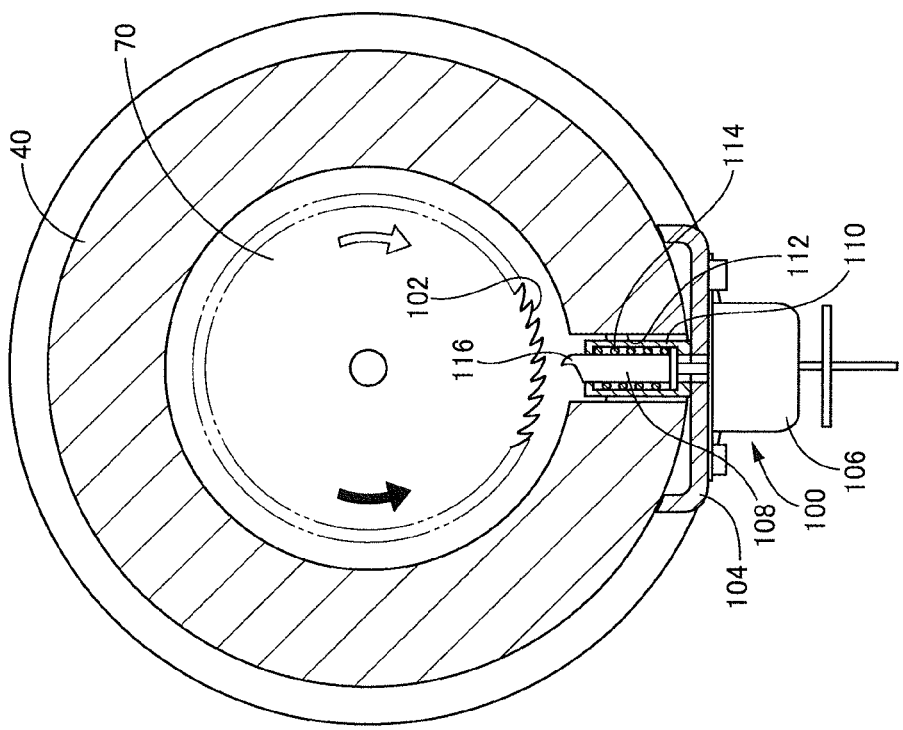

VEHICLE BRAKE DEVICE

CROSS REFERENCE TO RELATED APPLICATION

The present application claims priority from Japanese Patent Application No. 2018-100411, which was filed on May 25, 2018, the disclosure of which is herein incorporated by reference in its entirety.

BACKGROUND

Technical Field

The following disclosure relates to a vehicle electric brake device.

Description of Related Art

There has been developed a brake device for vehicles configured to generate a braking force in dependence on a force generated by an electric motor without using a working fluid such as a brake oil. Such a brake device, namely, an electric brake device, is configured such that a piston is advanced by the force of the electric motor and a friction member, such as a brake pad, is pushed by the piston onto a rotary body such as a disc rotor, so as to generate the braking force. As described in Japanese Patent Application Publication No. 2015-107745, for instance, the electric brake device is equipped with a piston-retracting prohibiting mechanism configured to prohibit the piston from being retracted. The publication describes that the electric brake device operates as a parking brake by prohibiting the piston from being retracted with the braking force kept generated.

SUMMARY

The electric brake device described above is controlled by a controller that includes a computer and drive circuits (drivers) respectively for the electric motor and the piston-retracting prohibiting mechanism. A situation is considered in which electric current supply to the electric motor and the piston-retracting prohibiting mechanism is cut off when the electric brake device is functioning as a parking brake, specifically, when the piston is being advanced by the electric motor in a state in which the piston-retracting prohibiting mechanism works. In such a situation, it is expected that the piston is retracted or moved backward, by an elastic reaction force of the friction member, to a position at which the braking force cannot be generated. The utility of the electric brake device having the parking brake function can be enhanced by obviating such a situation. Accordingly, the present disclosure is directed to a vehicle brake device having high utility.

In one aspect of the present disclosure, a brake device for a vehicle includes: a rotary body configured to rotate with a wheel; a friction member configured to generate a braking force for the wheel by being pushed onto the rotary body; an actuator including a piston configured to push the friction member onto the rotary body by being advanced, an electric motor, and a motion converting mechanism configured to convert a rotating motion of the electric motor into an advancing and retracting movement of the piston; a piston-retracting prohibiting mechanism including a toothed wheel configured to rotate in conjunction with the piston and having ratchet teeth on its periphery, a stopper configured to lock the ratchet teeth of the toothed wheel, a stopper biasing mechanism configured to bias the stopper in a direction in which the stopper moves from a locking position at which the stopper can lock the ratchet teeth to a non-locking position at which the stopper cannot lock the ratchet teeth, and a stopper keeping device configured to keep the stopper positioned at the locking position by an electric current supplied thereto against a biasing force of the stopper biasing mechanism, the piston-retracting prohibiting mechanism being configured to prohibit the piston from being retracted in a state in which the stopper locks the ratchet teeth; and a controller connected to an electric power source and configured to control supply of an electric current to the electric motor and supply of the electric current to the stopper keeping device, wherein an electricity storage device is provided in parallel with the stopper keeping device.

Advantageous Effects

A situation is considered in which the controller or the power source suffers from a failure in which electric current supply to the stopper keeping device and the electric motor is cut off in the midst of the advancing movement of the piston by the electric current supplied to the electric motor while the electric current is supplied to the stopper keeping device that constitutes the piston-retracting prohibiting mechanism. In this situation, in a vehicle brake device not equipped with the electricity storage device described above, at the same time when the failure occurs, the stopper is caused to be positioned at the non-locking position, so that the retracting movement of the piston cannot be prohibited. When the retracting movement of the piston is not prohibited, the piston is retracted, by an elastic reaction force of the friction member, to a position at which the braking force can be hardly generated. In contrast, the vehicle brake device according to the present disclosure is equipped with the electricity storage device. Accordingly, even when the failure described above occurs, the electric current is supplied from the electricity storage device to the stopper keeping device for a certain time period, so that the state in which the retracting movement of the piston is prohibited by the piston-retracting prohibiting mechanism continues. Thus, the braking force that is being generated at the time of occurrence of the failure is substantially ensured. In short, it is possible to obviate a situation in which the braking force can be hardly generated. Accordingly, the brake device according to the present disclosure has high utility.

BRIEF DESCRIPTION OF THE DRAWINGS

The objects, features, advantages, and technical and industrial significance of the present disclosure will be better understood by reading the following detailed description of an embodiment, when considered in connection with the accompanying drawings, in which:

FIGS. 4A and 4B are views of the actuator in cross section different from FIG. 2, the views being for explaining a piston-retracting prohibiting mechanism of the actuator illustrated in FIG. 2.

DETAILED DESCRIPTION OF THE EMBODIMENT

Figure 1:
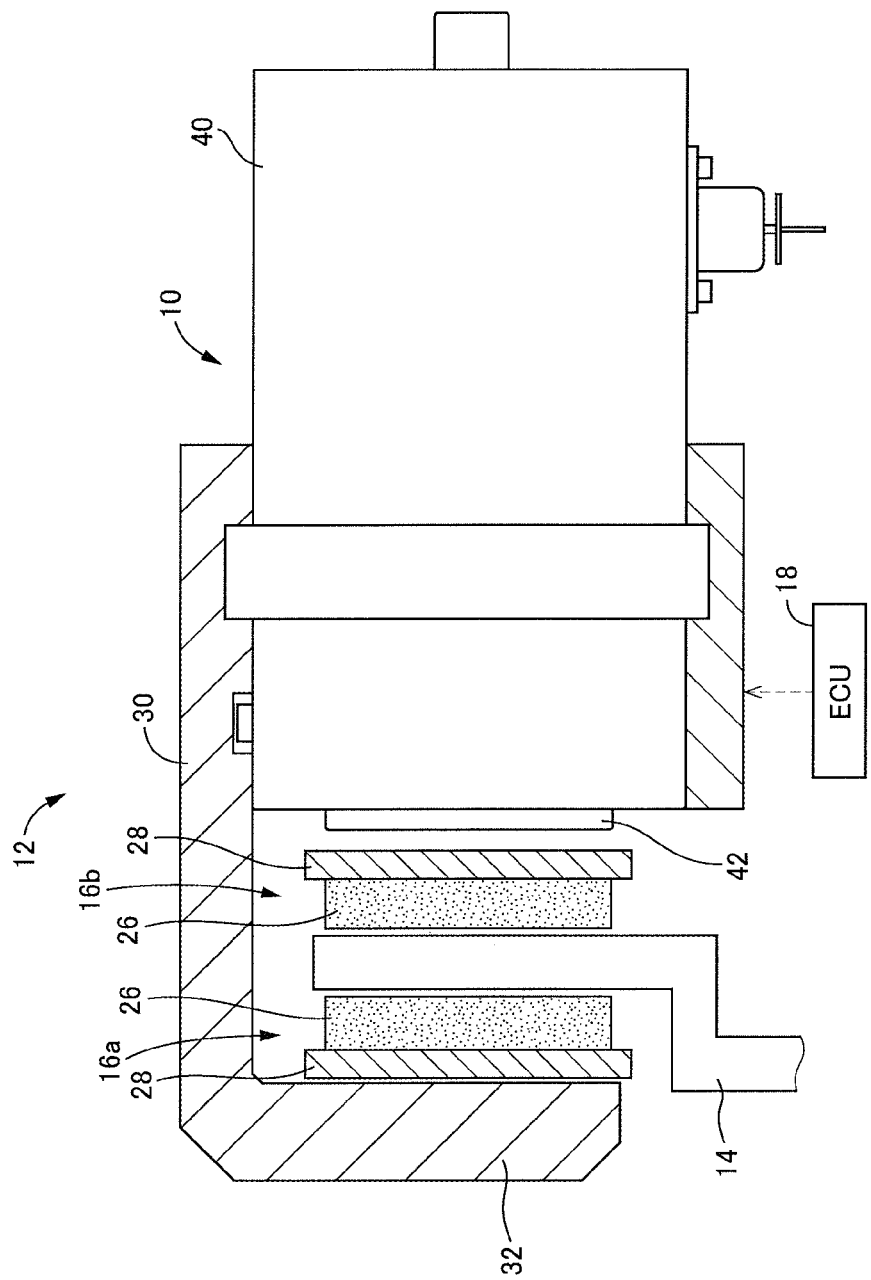
FIG. 1 is a cross-sectional view illustrating an overall structure of a vehicle brake device according to one embodiment.

Referring to the drawings, there will be explained below in detail a vehicle brake device according to one embodiment of the present disclosure. It is to be understood that the disclosure is not limited to the details of the following embodiment but may be changed and modified based on the knowledge of those skilled in the art.

A. Overall Structure of Vehicle Brake Device

As shown in FIG. 1, a vehicle brake device (hereinafter referred simply to as "brake device" where appropriate) according to the present embodiment includes: a brake caliper 12 (hereinafter referred simply to as "caliper 12" where appropriate) that holds an actuator 10; a disc rotor 14, as a rotary body, configured to rotate with a wheel; a pair of brake pads 16a, 16b (hereinafter referred simply to as "pad 16a" and "pad 16b" where appropriate); and an electronic control unit (ECU) 18, as a controller, that will be explained in detail.

The caliper 12 is held by a mount (not shown) provided on a carrier (not shown) that rotatably holds the wheel, such that the caliper 12 is movable in the axial direction, i.e., the right-left direction in FIG. 1, and such that the caliper 12 straddles the disc rotor 14. The pads 16a, 16b are held by the mount so as to sandwich the disc rotor 14 therebetween in a state in which the pads 16a, 16b are movable in the axial direction. Each of the pads 16a, 16b includes: a friction member 26 disposed on one side thereof on which the pad 16a, 16b comes into contact with the disc rotor 14; and a backup plate 28 supporting the friction member 26. The friction member 26 of each pad 16a, 16b is configured to be pushed onto the disc rotor 14.

For the sake of convenience, a left side and a right side in FIG. 1 are defined as a front side and a rear side, respectively. The pad 16a located on the front side is supported by a front end portion (claw portion) 32 of a caliper main body 30. The actuator 10 is held by a rear-side portion of the caliper main body 30 such that a housing 40 of the actuator 10 is fixed to the rear-side portion of the caliper main body 30. The actuator 10 includes a piston 42 configured to advance and retract relative to the housing 40. When the piston 42 advances, a front end portion, namely, a front end, of the piston 42 comes into engagement with the rear-side pad 16b, specifically, the backup plate 28 of the rear-side pad 16b. When the piston 42 further advances while being kept engaged with the backup plate 28 of the rear-side pad 16b, the pair of pads 16a, 16b sandwich or nip the disc rotor 14 therebetween. In other words, the pads 16a, 16b are pushed onto the disc rotor 14. Owing to the pushing of the pads 16a, 16b, there is generated a braking force for stopping rotation of the wheel that depends on a friction force between the disc rotor 14 and the friction members 26, namely, there is generated a braking force for reducing the speed of the vehicle or stopping the vehicle.

It may be possible to employ the actuator 10 as a constituent element of a caliper which is configured such that one of the brake pads is fixed to or fixedly engaged with the front end portion of the piston and the other of the brake pads is fixed to the front end portion of the caliper main body.

B. Structure of Actuator i) Basic Structure

Figure 2:
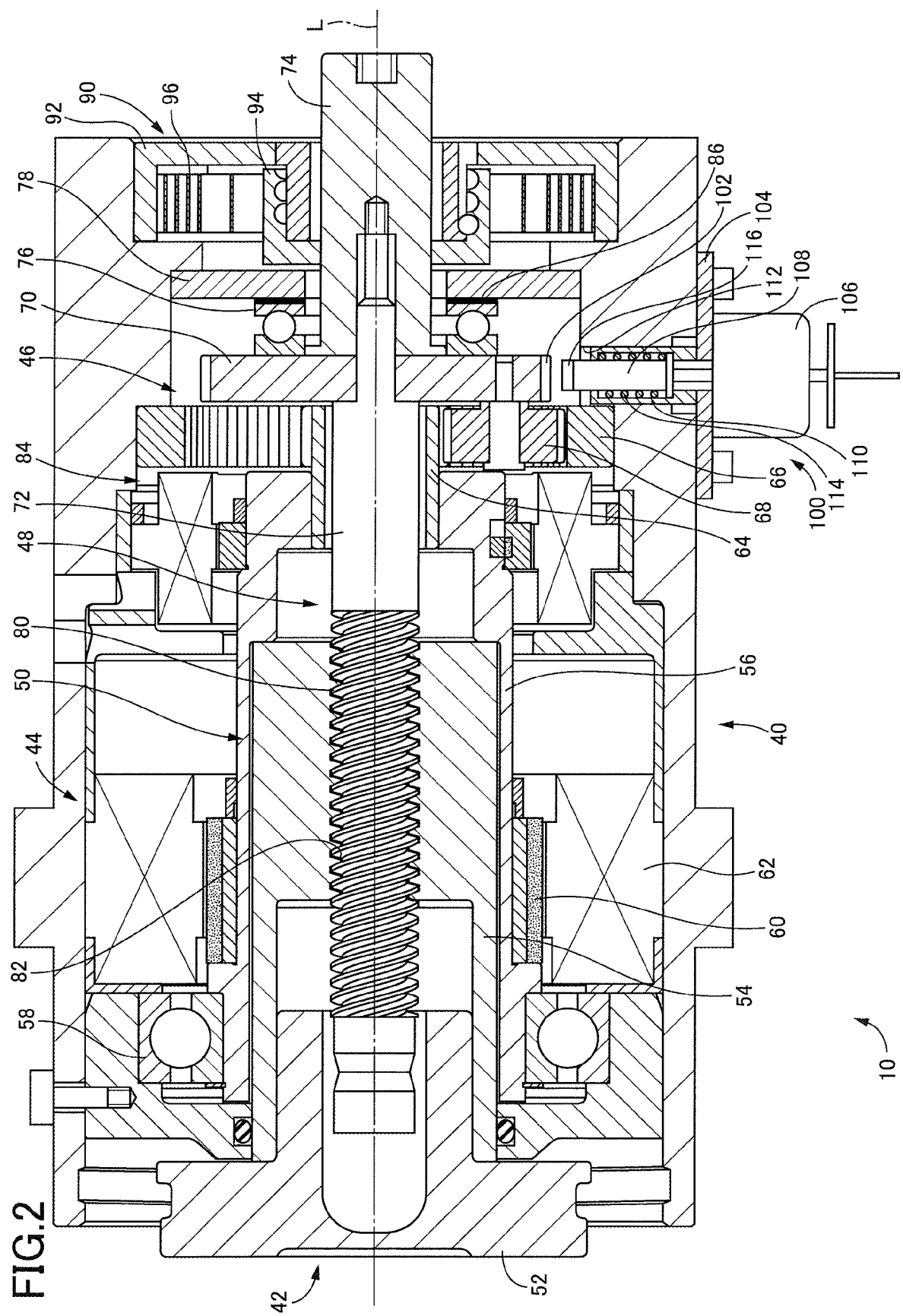
FIG. 2 is a cross-sectional view of an actuator of the vehicle brake device according to the embodiment.

As shown in FIG. 2, the actuator 10 includes the housing 40, the piston 42, an electric motor 44 as a drive source, a speed reducer 46 for decelerating rotation of the electric motor 44, an input shaft 48 configured to be rotated by rotation of the electric motor 44 decelerated by the speed reducer 46, and a motion converting mechanism 50 configured to convert the rotating motion of the input shaft 48 into an advancing and retracting movement of the piston 42 (i.e., a forward and backward movement). In the following explanation, a left side and a right side in FIG. 2 are defined as a front side and a rear side, respectively, for the sake of convenience.

The piston 42 includes a piston head 52 and an output sleeve 54 which is a hollow cylindrical portion of the piston 42. The electric motor 44 includes a cylindrical rotary drive shaft 56. The output sleeve 54 is disposed in the rotary drive shaft 56, and the input shaft 48 is disposed in the output sleeve 54, such that the output sleeve 54, the rotary drive shaft 56, and the input shaft 48 are coaxial relative to each other, specifically, such that respective axes of the rotary drive shaft 56, the output sleeve 54, and the input shaft 48 coincide with an axis L common thereto. Thus, the actuator 10 is compact in size.

The rotary drive shaft 56 is held by the housing 40 via a radial bearing 58 so as to be rotatable and immovable in an axial direction (which is a direction of extension of the axis L and coincides with the right-left direction in FIG. 2). The electric motor 44 includes magnets 60 arranged on one circumference of an outer circumferential portion of the rotary drive shaft 56 and coils 62 fixed to an inner circumferential portion of the housing 40 so as to surround the magnets 60.

The speed reducer 46 is of a planetary gear type including a hollow sun gear 64 attached and fixed to a rear end of the rotary drive shaft 56, a ring gear 66 fixed to the housing 40, and a plurality of planetary gears 68 (only one of which is illustrated in FIG. 2) engaging with both of the sun gear 64 and the ring gear 66 so as to revolve about the sun gear 64. Each of the plurality of planetary gears 68 is rotatably held by a flange 70 as a carrier. The input shaft 48 includes a front-side shaft 72 that constitutes a front-side portion of the input shaft 48 and a rear-side shaft 74 that constitutes a rear-side portion of the input shaft 48. The front-side shaft 72 and the rear-side shaft 74 are threadedly engaged with each other. The flange 70 is sandwiched between and fixed by the front-side shaft 72 and the rear-side shaft 74, whereby the flange 70 rotates together with the front-side shaft 72 and the rear-side shaft 74, namely, the flange 70 rotates together with the input shaft 48. The rotation of the rotary drive shaft 56, namely, the rotation of the electric motor 44, is decelerated by the speed reducer 46 and transmitted as the rotation of the input shaft 48. The input shaft 48 is held by the housing 40 via the flange 70, a thrust bearing 76, and a support plate 78, so as to be rotatable and immovable in the axial direction.

External threads 80 are formed on an outer circumferential portion of the front-side shaft 72 of the input shaft 48, and internal threads 82 which are threadedly engaged with the external threads 80 are formed in the output sleeve 54. That is, the input shaft 48 on which the external threads 80 are formed functions as a rotating member which is rotatable by the rotation of the electric motor 44, and the output sleeve 54 in which the internal threads 82 are formed functions as a linearly moving member which is advanceable and retractable for advancing and retracting the piston 42. The motion converting mechanism 50 is constituted by the input shaft 48 and the output sleeve 54. It may be considered that the linearly moving member and the piston are integral in the actuator 10.

A trapezoidal thread having relatively high strength is employed as each of the external threads 80 and the internal threads 82. There is provided, between the external threads 80 and the internal threads 82, grease as a lubricant for a smooth motion of the motion converting mechanism 50, namely, for a smooth motion of the actuator 10. The actuator 10 employs the motion converting mechanism in which the rotating member includes the external threads and the linearly moving member includes the internal threads. The actuator may employ a motion converting mechanism in which the rotating member includes the internal threads and the linearly moving member includes the external threads.

As apparent from the explanation, in the actuator 10, the rotation of the electric motor 44 causes the piston 42 to be advanced or retracted. FIG. 2 shows a state in which the piston 42 is positioned at the rearmost position in its movable range (hereinafter referred to as "set backward position" where appropriate). Specifically, when the electric motor 44 rotates forwardly from this state, the piston 42 is advanced, and as apparent from FIG. 1, the pads 16a, 16b are pushed onto the disc rotor 14 with the front end of the piston 42 held in engagement with the pad 16b, so that the braking force is generated. In this respect, the magnitude of the braking force corresponds to an electric current supplied to the electric motor 44. Subsequently, when the electric motor 44 rotates reversely, the piston 42 is retracted, and the piston 42 and the pad 16b are accordingly disengaged from each other, so that the braking force is not generated. Finally, the piston 42 returns to the set backward position shown in FIG. 2.

As is understood from the explanation above, the brake device of the present embodiment which is the electric brake device is configured such that the force generated by the electric motor 44 acts directly on the brake pads 16a, 16b (each as the friction member) without using a working fluid such as a brake oil, so as to push the brake pads 16a, 16b onto the disc rotor 14 (as the rotary body) for generating the braking force. In short, the brake device is configured to generate the braking force that directly depends on the force generated by the electric motor 44. In this respect, the friction member 26 of each of the pads 16a, 16b may be regarded as an elastic member. The friction members 26 are elastically deformed by an amount corresponding to the braking force that is being generated.

In addition to the constituent components described above, the actuator 10 includes a resolver 84 for detecting a rotation angle of the electric motor 44. The resolver 84 functions as a motor rotation angle sensor. Based on a detection signal of the resolver 84, the position and the movement amount of the piston 42 in the axial direction, specifically, the rotational position of the input shaft 48, can be detected. Further, there is disposed, between the support plate 78 and the thrust bearing 76, an axial-force sensor 86 (as a load cell) for detecting a force in a thrust direction acting on the input shaft 48, namely, an axial force (axial load). The axial force corresponds to a force by which the piston 42 pushes the brake pad 16b onto the disc rotor 14. Based on a detection value of the axial-force sensor 86, it is possible to detect the braking force being generated by the brake device.

ii) Piston Biasing Mechanism

In the present actuator 10, the negative efficiency of the motion converting mechanism 50 is not so high as compared with the positive efficiency thereof. That is, even when the force to retract the piston 42 acts on the piston 42, the input shaft 48 does not easily rotate. In the case where supply of the electric current to the electric motor 44 is cut off, for instance, in a state in which the piston 42 has been advanced and the braking force is being generated, the piston 42 cannot be easily retracted. In this case, it is expected that the braking force is kept generated. In view of such a case, the actuator 10 includes a mechanism for biasing the piston 42 in a direction in which the piston 42 is retracted by an elastic force exerted by an elastic member. Specifically, the actuator 10 includes a piston biasing mechanism 90 configured to give, to the input shaft 48, a rotational biasing force (which may be referred to as a "rotational torque") in the direction in which the piston 42 is retracted. In short, the piston biasing mechanism 90 is configured to indirectly bias the piston 42 in the direction in which the piston 42 is retracted.

Specifically, the piston biasing mechanism 90 is constituted by an outer ring 92 fixed to the housing 40, an inner ring 94 fixed to the rear-side shaft 74 of the input shaft 48 so as to rotate therewith and disposed on an inner side of the outer ring 92, and a spiral spring 96 as the elastic member disposed between an inner circumferential surface of the outer ring 92 and an outer circumferential surface of the inner ring 94.

Figure 3A:
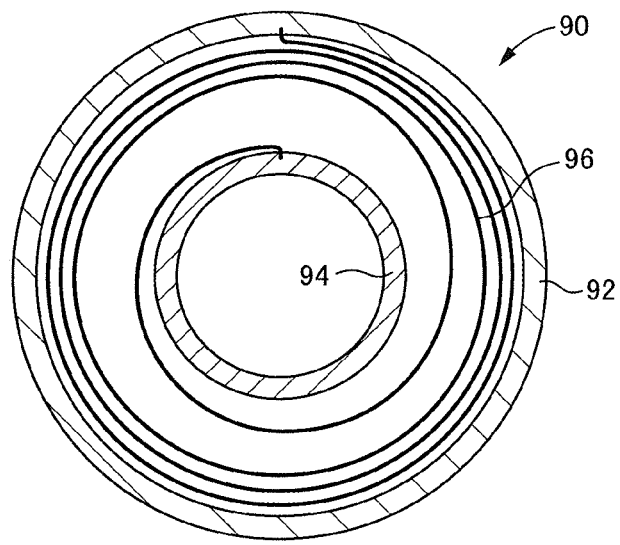
FIGS. 3A and 3B are views for explaining a piston biasing mechanism of the actuator illustrated in FIG. 2.
Figure 3B:
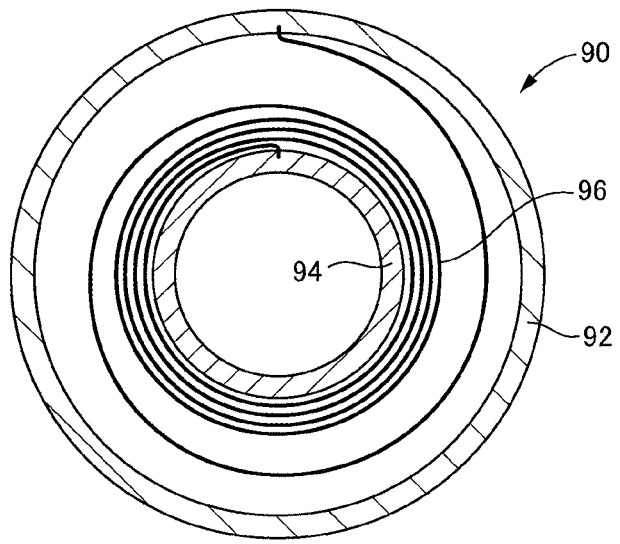

In the state of FIG. 2, namely, in the state in which the piston 42 is positioned at the set backward position indicated above, the spiral spring 96 is hardly elastically deformed as shown in FIG. 3A, and the spiral spring 96 does not substantially generate the elastic force. Subsequently, as the input shaft 48 is rotated by the electric motor 44 and the piston 42 is accordingly advanced, the spiral spring 96 is gradually wound and contracted as shown in FIG. 3B, so as to generate the elastic force. That is, the elastic force whose magnitude corresponds to an amount of the advancing movement of the piston 42 that has been advanced from the set backward position acts on the input shaft 48 as a biasing force against the advancing movement of the piston 42, namely, as a biasing force in the direction in which the piston 42 is retracted. In other words, the biasing force that acts on the input shaft 48 by the spiral spring 96 increases as the piston 42 is advanced further. The rotational biasing force enables the piston 42 to be easily retracted. For instance, even in the case where the piston 42 cannot be retracted by the electric motor 44 in the state in which the piston 42 has been advanced and the braking force is being generated, the piston 42 can be retracted by the rotational biasing force.

iii) Parking Brake Function

A piston-retracting prohibiting mechanism 100 is provided in the actuator 10 of the present brake device. The piston-retracting prohibiting mechanism 100 is configured to prohibit the piston 42 from being retracted in the state in which the piston 42 has been advanced, for permitting the brake device to exert a function as an electric parking brake.

Referring also to FIG. 4, ratchet teeth 102 are formed on the periphery of the flange 70. The flange 70 is rotated by the rotation of the input shaft 48. Thus, the flange 70 functions as a toothed wheel that rotates in conjunction with the advancing and retracting movement of the piston 42. An electromagnetic solenoid 106 which is an electromagnetic actuator is fixed to the housing 40 of the actuator 10 via a seat plate 104. The electromagnetic solenoid 106 will be hereinafter simply referred to as "solenoid 106" where appropriate. When an electric current is supplied to the solenoid 106, a locking rod 108, as a movable member, is moved in an axial direction thereof by the solenoid 106, specifically, in a direction toward the flange 70. A guide sleeve 110 is attached to the seat plate 104. The locking rod 108 is advanced and retracted while being guided by the guide sleeve 110. A cutout 112 is formed in the housing 40 of the actuator 10. The guide sleeve 110 is received in the cutout 112, and the locking rod 108 is disposed in the guide sleeve 110 such that a distal end of the locking rod 108 protrudes into the housing 40. A compression coil spring (hereinafter simply referred to as "spring" where appropriate) 114 is disposed in the guide sleeve 110. The spring 114 biases the locking rod 108 in a direction away from the flange 70.

A pawl 116 is formed at the distal end of the locking rod 108. The pawl 116 is engageable with the ratchet teeth 102 of the flange 70. That is, the locking rod 108 functions, at the pawl 116 thereof, a stopper for locking the ratchet teeth 102. (It may be considered that the stopper is provided for the locking rod 108 as the movable member.) FIGS. 2 and 4A show a state in which the locking rod 108 is positioned at a non-locking position at which the locking rod 108 cannot lock the ratchet teeth 102. FIG. 4B shows a state in which the locking rod 108 is positioned at a locking position at which the locking rod 108 can lock the ratchet teeth 102, specifically, a state in which the pawl 116 of the locking rod 108 is caught by any one of the ratchet teeth 102. That is, FIG. 4B shows a state in which the locking rod 108 actually locks the ratchet teeth 102.

In other words, the spring 114 constitutes a stopper biasing mechanism configured to bias the locking rod 108 in a direction in which the locking rod 108 moves from the locking position to the non-locking position. Further, the solenoid 106 biases the locking rod 108 (as the movable member) toward the ratchet teeth 102 by an electric current supplied thereto, so as to constitute a stopper keeping device configured to keep the locking rod 108 positioned at the locking position against the biasing force of the spring 114.

As apparent from the shapes (orientations) of the ratchet teeth 102 and the pawl 116 of the locking rod 108, in the state in which the locking rod 108 is positioned at the locking position by the electric current supplied to the solenoid 106, the flange 70 is prohibited from rotating in the direction in which the piston 42 is retracted. (This direction is indicated by the black arrow in FIGS. 4A and 4B and will be hereinafter referred to as "reverse rotational direction" where appropriate.) However, the flange 70 is allowed to rotate in the direction in which the piston 42 is advanced. (This direction is indicated by the white arrow in FIGS. 4A and 4B and will be hereinafter referred to as "forward rotational direction" where appropriate.) That is, while the pawl 116 is kept in contact with any one of the ratchet teeth 102 by the electromagnetic force of the solenoid 106, the locking rod 108 is moved in the direction away from the center of the flange 70, so that the flange 70 is allowed to rotate in the forward rotational direction. Such action is known as action of an ordinary ratchet mechanism (one-way clutch mechanism) that includes a ratchet wheel and a stopper. Owing to the action, the piston-retracting prohibiting mechanism 100 prohibits the piston 42 from being retracted. In this respect, the locking position means not only a position at which the locking rod 108 actually locks the ratchet teeth 102 but also a position at which the locking rod 108 is in contact with any one of the ratchet teeth 102 in a state in which the locking rod 108 is biased by the solenoid 106 toward the center of the flange 70.

In the state in which the locking rod 108 locks the ratchet teeth 102, the pawl 116 is kept caught by any one of the ratchet teeth 102 even if the supply of the electric current to the solenoid 106 is cut off. Accordingly, the locking rod 108 does not move to the non-locking position even by the biasing force of the spring 114.

Figure 5:
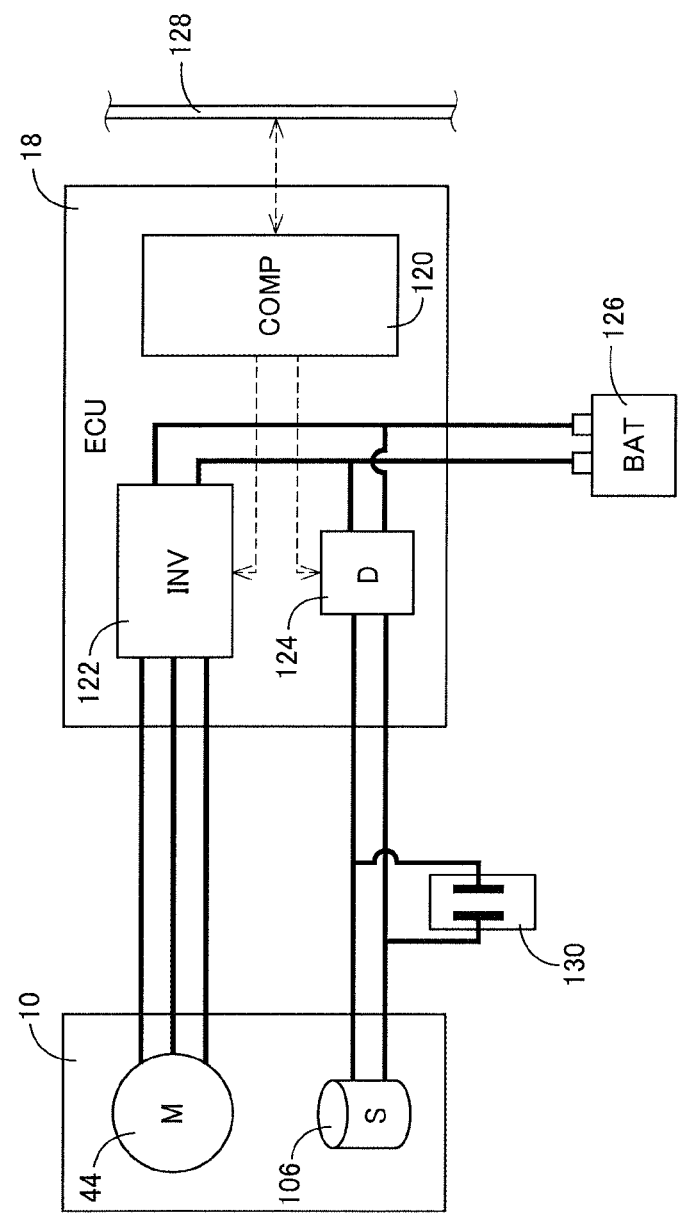
FIG. 5 is a block diagram schematically illustrating an electronic control unit as a controller for controlling the vehicle brake device of the embodiment.

C. Configuration of Electronic Control Unit and Control by the Unit i) Configuration of Electronic Control Unit As shown in FIG. 5, the ECU 18 as a controller includes: a computer 120 including a CPU, a ROM, a RAM, etc.; an inverter 122 as a drive circuit for the electric motor 44 of the actuator 10 which is a three-phase DC brushless motor; and a driver 124 as a drive circuit for the solenoid 10 of the piston-retracting prohibiting mechanism 100. The ECU 18 is connected to a battery 126 as a power source, specifically, the inverter 122 and the driver 124 are connected to the battery 126. The inverter 122 has a function of controlling supply of the electric current to the electric motor 44 based on a command signal of the computer 120, and the driver 124 has a function of controlling supply of the electric current to the solenoid 106 based on a command signal of the computer 120. Further, the ECU 18, specifically, the computer 120, is connected to a car area network or controllable area network (CAN) 128 and performs exchange of signals with other electronic control unit, sensors and the like, via the CAN 128.

ii) Braking Force Control

Ordinary braking force control in the present brake device, namely, the braking force control as a service brake, is well known and will be briefly explained. The vehicle on which the present brake device is installed is equipped with a brake pedal (not shown) as a brake operation member. A signal indicative of an amount (force) of operation of the brake pedal by a driver is sent from a sensor (not shown) to the computer 120 via the CAN 128. The computer 120 determines, based on the signal, a target braking force which is the braking force to be generated by the brake device and determines, based on the target braking force, a target electric current which is the electric current to be supplied to the electric motor 44, such that the braking force that is being actually generated becomes equal to the target braking force. A command as to the target electric current is sent to the inverter 122, and the inverter 122 supplies the electric current to the electric motor 44 based on the command. Thus, the piston 42 is advanced until the braking force becomes equal to the target braking force. In this respect, the computer 120 grasps the braking force that is being actually generated based on the axial force detected by the axial-force sensor 86. Thus, the control of the braking force is feedback control based on the axial force.

iii) Parking Brake Control

There will be briefly explained parking brake control executed when the parking brake is applied. The computer 120 receives, via the CAN 128, a signal indicating that the driver has operated a parking switch. The reception of the signal by the computer 120 triggers the driver 124 to supply the electric current to the solenoid 106. The supply of the electric current to the solenoid 106 causes the locking rod 108 to advance toward the flange 70 against the biasing force of the spring 114, so that the locking rod 108 is positioned at the locking position shown in FIG. 4B.

In the state in which the locking rod 108 is positioned at the locking position, the computer 120 commands the inverter 122 to supply the electric current to the electric motor 44 for advancing the piston 42 until a braking force that is set in advance, i.e., a parking braking force, is obtained. After the braking force has been obtained, the computer 120 issues, to the inverter 122, a command to stop the supply of the electric current to the electric motor 44. Due to the stoppage of the supply of the electric current to the electric motor 44, the flange 70 is rotated in the reverse rotational direction by the elastic reaction force of the friction members 26 of the pads 16a, 16b and the elastic reaction force of the spiral spring 96 of the piston biasing mechanism 90 after a lapse of a short time from the stoppage of the supply of the electric current to the electric motor 44, so that the state in which the locking rod 108 locks the ratchet teeth 102 is established. After this state has been established, the computer 120 causes the driver 124 to stop the supply of the electric current to the solenoid 106. Even if the supply of the electric current to the solenoid 106 stops, the locking rod 108 does not return to the non-locking position owing to the shapes of the ratchet teeth 102 and the pawl 116, so that the locking rod 108 keeps locking the ratchet teeth 102. As a result, the braking force is kept generated in substantially the same magnitude as the preset braking force described above.

When the parking brake is released, the electric current is supplied to the electric motor 44 such that the flange 70 rotates in the forward rotational direction by an amount corresponding to one tooth of the ratchet teeth 102 without supplying the electric current to the solenoid 106, so that the locking rod 108 is retracted to the non-locking position by the biasing force of the spring 114 as shown in FIG. 4A. Thus, the locking of the ratchet teeth 102 by the locking rod 108 is canceled. When the locking is cancelled, the piston 42 is retracted to the set backward position by the elastic reaction force of the spiral spring 96 of the piston biasing mechanism 90.

iv) Control of Cancelling Braking-Force Reduced State

When the vehicle is parked and the parking brake is applied after normal running for a certain time, the disc rotor 14 and the pads 16a, 16b are in a heated state, and the friction members 26 (each as the elastic member) of the pads 16a, 16b are thermally expanded to a certain extent. In the case where the parking brake is applied and the vehicle is parked with the friction members 26 thermally expanded, the disc rotor 14 and the pad 16a, 16b cool down with a lapse of time after application of the parking brake, and the friction members 26 contract. The contraction of the friction members 26 leads to a reduction in the braking force.

To prevent such a situation, the present brake device executes a control of cancelling a braking-force reduced state, namely, eliminating slackening of the braking force. (This control will be hereinafter referred to as "braking-force-reduced-state cancelling control" where appropriate.) In the case where the vehicle is parked in a state in which the piston 42 is prohibited from being retracted by the piston-retracting prohibiting mechanism 100 while the brake device is generating the braking force, the braking-force-reduced-state cancelling control is automatically executed when a set time elapses from a time point when the vehicle is parked. In the braking-force-reduced-state cancelling control, the computer 120 causes the electric current to be supplied to the solenoid 106 via the driver 124 and commands the inverter 122 to supply the electric current to the electric motor 44 for advancing the piston 42 by a distance, i.e., the set distance, which is set such that the braking force is estimated to be restored to the parking braking force if the piston 42 is advanced by the distance. As a result of the command, the braking force is increased. After the piston 42 has been moved by the set distance, the computer 120 commands the inverter 122 to stop the supply of the electric current to the electric motor 44. Thereafter, the computer 120 stops the supply of the electric current to the solenoid 106 after a short time has elapsed for waiting for the locking rod 108 to lock the ratchet teeth 102.

In the braking-force-reduced-state cancelling control, the piston 42 is advanced by the set distance. The piston 42 may be advanced until the braking force that is being actually generated becomes equal to the set parking braking force, based on detection by the axial-force sensor 86, for instance.

D. Occurrence of Failure of Current Supply and Measures to Deal with Failure

Next, there is considered occurrence of a situation in which the electric current fails to be supplied to the electric motor 44 and the solenoid 106 in the midst of execution of the parking brake control or the braking-force-reduced-state cancelling control. Such a situation occurs due to a failure of the battery 126 as the power source, a break in a wire for electric current supply from the battery 126 to the ECU 18, a failure of the ECU 18, or the like.

In the case where the situation described above occurs in the midst of the advancing movement of the piston 42 by the supply of the electric current to the electric motor 44 with the braking force being generated while the locking rod 108 is kept positioned at the locking position by the supply of the electric current to the solenoid 106, the locking rod 108 tends to be moved back to the non-locking position by the biasing force of the spring 114, and the flange 70 is rotated in the reverse rotational direction by the elastic reaction force of the spiral spring 96 of the piston biasing mechanism 90 in addition to the elastic reaction force of the friction members 26 of the pads 16a, 16b. In this instance, the locking rod 108 cannot lock the ratchet teeth 102 depending on the rotational position of the flange 70. That is, the piston-retracting prohibiting mechanism 100 does not exert its function depending on the positional relationship between the ratchet teeth 102 and the pawl 116. Accordingly, the piston 42 is retracted to the set backward position, whereby the braking force that has been generated so far is no longer generated. That is, a braking-force absent state is caused.

The provision of the piston biasing mechanism 90 inevitably increases the possibility of causing the braking-force absent state. In the case where the piston biasing mechanism 90 is not provided, the piston 42 is retracted only to a position at which the braking force is hardly generated. In the case where the piston biasing mechanism 90 is provided, the piston 42 is retracted as far as to the set backward position. In this case, the speed of the retracting movement of the piston 42 is considerably high, resulting in a high possibility of causing the braking-force absent state. Further, the braking-force absent state is problematic in the midst of execution of the braking-force-reduced-state cancelling control that is executed when the vehicle driver is probably away from the vehicle, namely, when the vehicle is probably unattended by the vehicle driver. Thus, it is particularly important to deal with such a situation during execution of the braking-force-reduced-state cancelling control.

To deal with the situation, that is, to obviate the braking-force absent state, the present brake device includes a condenser (which may also be referred to as a capacitor) 130 as an electricity storage device. As shown in FIG. 5, the condenser 130 is disposed between: the solenoid 106 that constitutes the stopper keeping device; and the ECU 18, specifically, the driver 124 of the ECU18, so as to be in parallel with the solenoid 106.

The condenser 130 receives electric current supply from the driver 124 at the same time when the solenoid 106 receives electric current supply from the driver 124. That is, the condenser 130 stores electricity. In the case where the situation described above occurs, the solenoid 106 keeps receiving electric current from the condenser 130 until the quantity of electricity in the condenser 130 becomes zero, in other words, until the electricity in the condenser 130 runs out, so that the locking rod 108 is kept positioned at the locking position for some time. In this configuration, even if the electric current supply to the electric motor 44 is cut off and the piston 42 accordingly tends to retract, the locking rod 108 keeps locking the ratchet teeth 102. Thus, even if the situation described above occurs, it is possible to maintain the braking force whose magnitude is substantially the same as the braking force that is being generated at the time of occurrence of the situation. Accordingly, the condenser 130 enables the braking-force absent state to be obviated.

While the storage capacity of the condenser 130 is not limited to a particular value, it is preferable that the condenser 130 store the electricity whose amount enables the locking rod 108 to be kept positioned at the locking position at least for a time period required for the flange 70 to rotate in the reverse rotational direction by an amount corresponding to one tooth of the ratchet teeth 102.

What is claimed is:

1. A brake device for a vehicle, comprising:
a rotary body configured to rotate with a wheel;
a friction member configured to generate a braking force for the wheel by being pushed onto the rotary body;
an actuator including a piston configured to push the friction member onto the rotary body by being advanced, an electric motor, and a motion converting mechanism configured to convert a rotating motion of the electric motor into an advancing and retracting movement of the piston;
a piston-retracting prohibiting mechanism including (a) a toothed wheel configured to rotate in conjunction with the piston and having ratchet teeth on its periphery, (b) a stopper configured to lock the ratchet teeth of the toothed wheel, (c) a stopper biasing mechanism configured to bias the stopper in a direction in which the stopper moves from a locking position at which the stopper can lock the ratchet teeth to a non-locking position at which the stopper cannot lock the ratchet teeth, and (d) a stopper keeping device configured to keep the stopper positioned at the locking position by an electric current supplied thereto against a biasing force of the stopper biasing mechanism, the piston-retracting prohibiting mechanism being configured to prohibit the piston from being retracted in a state in which the stopper locks the ratchet teeth;
a controller connected to an electric power source and configured to control supply of an electric current to the electric motor and supply of the electric current to the stopper keeping device; and
an electricity storage device provided in parallel with the stopper keeping device, the electricity storage device being configured to supply the stopper keeping device with enough current to maintain the stopper in the locked position when the electric current from the controller is cut off.

2. The brake device according to claim 1, wherein, in case where the vehicle is parked in a state in which the piston is prohibited from being retracted by the piston-retracting prohibiting mechanism while the brake device is generating a braking force, the controller automatically executes a braking-force-reduced-state cancelling control when a set time elapses from a time point when the vehicle is parked, the braking-force-reduced-state cancelling control being a control in which the piston is advanced by rotating the electric motor while the electric current is supplied to the stopper keeping device.

3. The brake device according to claim 1, wherein the actuator includes a piston biasing mechanism configured to bias the piston in a direction in which the piston is retracted.

4. The brake device according to claim 1, wherein the electricity storage device is a condenser.

5. The brake device according to claim 1, wherein the stopper keeping device includes an electromagnetic solenoid for biasing the stopper toward the ratchet teeth by an electromagnetic force.

6. The braking device of claim 1, wherein the electricity storage device stores an amount of electricity to enable the stopper to remain at the locking position for at least a time period required for the toothed wheel to rotate an amount corresponding to one tooth.

* * * * *